United States Patent Office 3,207,745
Patented Sept. 21, 1965

3,207,745
METALLIZED MONOAZO REACTIVE
DYESTUFFS
Paul Dussy, St. Louis, France, and Werner Bossard, Riehen, near Basel, Switzerland, assignors to J. R. Geigy A.G., Basel, Switzerland
No Drawing. Filed Mar. 16, 1962, Ser. No. 180,318
Claims priority, application Switzerland, Mar. 17, 1961, 3,234/61
6 Claims. (Cl. 260—146)

The invention concerns reactive monoazo dyestuffs which are capable of entering into a chemical linkage with cellulose. It also concerns processes for the production of these dyestuffs and their use to attain fast dyeings as well as the material fast dyed with the aid of these dyestuffs.

It has now been found that valuable reactive monoazo dyestuffs are obtained if the diazo compound of an aromatic amine which can contain a metallisable group or a substituent which can be converted into such a group in the o-position to the diazotisable amino group is coupled with a coupling component of the benzene, naphthalene or pyrazolone series, the components being so chosen that together they contain at least one possibly further substituted arylureido radical and at least one substituent

and if desired, metallisable dyestuffs are reacted with an agent giving off heavy metal of an atomic number of 24 to 29.

The new dyestuffs correspond to the general formula

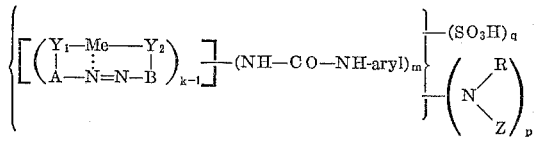

In this formula

Each of A and B independently is a benzene, naphthalene or pyrazolone radical,
"Aryl" is a possibly substituted phenyl or naphthyl radical,
Of $Y_1$ and $Y_2$, one is oxygen and the other is oxygen or a carboxy, imino or imido group, but preferably oxygen,
Me is a heavy metal of an atomic number of 24 to 29 possibly co-ordinated with uncoloured or coloured complex formers,
R is hydrogen or a possibly substituted low alkyl group,
Z is an organic radical which contains substituents which can be split off as anion groups capable of addition,
k, m and p are each a positive whole number of at most 2, and q is a positive whole number of at least 2.

Preferred dyestuffs according to the invention are obtained on using sulphonated benzene and naphthalene diazo compounds and on using hydroxynaphthalene and 5-pyrazolone compounds as coupling components and, in addition, by so choosing the components that the end product contains 2 to 6, preferably 3 to 4 sulphonic acid groups, only one possibly substituted phenylureido group and only one amino group substituted by a halogen di- or tri-azinyl radical, in particular a trichloropyrimidylamino group. Me is preferably copper.

Dyestuffs according to the invention are also obtained by a modified process by using diazo and coupling components for the formation of monoazo dyestuffs by the process described above which, instead of the group

contains a condensable amino group

or a substituent which can be converted into such a group, for example an acylamino group which can easily be saponified or a nitro group. After the coupling is complete and, if necessary, acylamino groups have been saponified or nitro groups reduced to amino groups, the condensable amino group

is converted into the group

as defined by reaction with a compound introducing the radical Z. Metallisable dyestuffs are reacted with an agent introducing heavy metal of the atomic numbers 24 to 29 in any suitable step in the above chain of reactions, i.e. before or after the substituent

has been attained or reacted.

Dyestuffs according to the invention are also obtained by another modified process by using diazo and coupling components for the formation of monoazo dyestuffs by the process described above which, instead of the group —NH—CO—NH—aryl, contain a condensable amino group —NH$_2$ or a substituent which can easily be converted into such, for example an acylamino group which can be easily saponified or a nitro group. After completion of the coupling and, if necessary, saponification of acylamino groups or reduction of nitro groups to amino groups, the amino group is converted into the group —NH—CO—NH—aryl as defined by reaction with a possibly further substituted arylisocyanate or aryl carbamic acid phenol ester. Again, metallisable dyestuffs are reacted with an agent introducing heavy metal of an atomic number of 24 to 29 in any suitable step of the above series of reactions, i.e. before or after attainment or reaction of the substituent —NH$_2$.

The radical

(or the radical to be converted thereinto) and also the possibly substituted arylureido group (or the group to be converted thereinto) can be bound both to the diazo component or to a radical thereof or to the coupling component or a radical thereof and it can be bound direct to aromatic rings thereof or in an external position to substituents of the latter. It can also be bound to the aryl radicals of benzoylamino groups.

In the radical

in addition to hydrogen, R is, for example, methyl, ethyl, propyl, butyl, hydroxyethyl, hydroxypropyl, cyanoethyl, benzyl; Z is the radical making the chemical linkage with the cellulose fibre possible. This radical contains, as mobile substituents which can be split off as anions, in a suitable position, principally halogen such as, particularly chlorine or bromine, or sulphated alcoholic hydroxyl groups —O—SO₃H or salts thereof with alkalies, or as grouping capable of addition, e.g., an olefinic group adjacent to an electrophilic group. Z is, for example, an aliphatic acyl radical having halogen in the β-position, e.g. the β-chloro- or, particularly, β-bromopropionyl radical, or an aliphatic unsaturated acyl radical, e.g., the acroyl radical, crotyl radical, maleoyl radical or fumaroyl radical, the α- or β-chloro-, α- or β-bromo- acroyl radical or α- or β-crotoyl radical, the chlorofumaroyl radical, in addition a sulphated β-hydroxyethyl or β-hydroxypropyl radical, if R is hydrogen. However, Z is principally a halogenazinyl radical which contains one or two groupings $$-N=C-\atop \mid \atop Hal$$

as ring components, wherein Hal is principally chlorine, or also bromine. In this case, Z is, e.g. a dichloro- or dibromo- pyrimidyl radical, a dichlorobromopyrimidyl radical, a dichloro-1,3,5-triazinyl radical or a monochchloro- or monobromo-1,3,5-tryazinyl radical which contains as further substituents, e.g. phenyl, alkoxy, alkylmercapto groups or amino groups and, in particular, substituted amino groups such as, e.g., sulphonated phenylamino groups.

Agents introducing the radical Z into condensable

groups are the acid halides, in particular the acid chlorides or also the acid bromides or acid anhydrides of carboxylic acids which contain in the acid radical the reactive substituents or groups capable of addition given above. However these are, in particular, cyclic imide halides of carbonic acid in which the reactive grouping $$-N=C\atop \mid \atop Hal$$

occurs more than once as component of a six-membered heterocyclic ring such as, e.g. cyanuric chloride, 2,4,6-trichloro- or 2,4,6-tribromopyrimidine, 2,4,5,6-tetrachloropyrimidine, 2,4,6-trichloro-5-bromopyrimidine, 2,4-dichloro-6-alkoxy-, -6-alkylthio-, -6-phenyl-, sulphophenylamino- 1,3,5-triazine etc. Care is taken by suitable choice of reaction conditions that only one of the mobile halogen atoms reacts and that it reacts with the condensable group

Depending on the reactivity of the components, the reaction is performed at temperatures as low as possible, e.g., 0 to 60° C., at pH values of the aqueous solution of 4 to at most 9, and in the presence of buffer salts such as alkali metal salts of polyvalent inorganic acids or of organic acids as mineral acid binding agents, e.g., using the sodium salts of phosphoric acids, carbonic acid, acetic acid. Naturally, the conditions for the reaction of the group

in the dyestuff structure also pertain for the production of diazo and coupling compounds usable according to the invention from intermediate products which contain a condensable group

As already mentioned, the arylureido group can be unsubstituted or substituted, in the latter case it can contain, e.g. inert substituents such as halogen, alkyl, alkoxy, alkylsulphonyl or sulphamyl groups possibly substituted at the nitrogen atom. In particular, it can also contain salt-forming substituents such as the sulphonic acid group or condensable or substituted amino groups, e.g., acylated or halogenazinylated amino groups, or amino groups. Diazo components having an arylureido group according to the invention are obtained, for example, by reacting an aromatic bisprimary amino compound having a sterically hindered amino group with an aryl isocyanate or with an arylcarbamic acid phenol ester the aryl radical of which can also be substituted. Examples of such bis-primary amino compounds with a sterically hindered amino group are 1,3-diaminobenzene-4-sulphonic acid and 1,4-diaminobenzene-2-sulphonic acid as well as their mono-m- or mono-p- aminobenzoyl derivatives. For the same purpose, also aromatic primary monoamines, in particular aminobenzene or aminonaphthalene sulphonic acids not having a sterically hindered amino group, can be reacted with nitroaryl iscyanates and the nitro group reduced to the amino group. Coupling components containing arylureido groups are obtained from azo components having a condensable primary amino group which does not or does not alone affect the coupling power, and from the aminobenzoyl derivatives thereof by reaction with aryl isocyanates or phenylcarbamic acid phenol esters. Suitable starting materials are, in particular, aminonophthalene sulphonic acids and their m- and p- aminobenzoyl derivatives.

Examples of diazo components containing an arylureido group which are usable according to the invention are: 4-amino-diphenyl urea-3,3'-disulphonic acid, 3-aminodiphenyl urea-4,3'disulphonic acid, 4-amino-diphenyl urea-3,4'-disulphonic acid, 3-amino-diphenyl urea-4,4'-disulphonic acid, 4-amino-4'-hydroxy-diphenyl urea-3'-carboxylic acid-3,5'-disulphonic acid, 3-amino-4'-hydroxy-diphenyl urea-3'-carboxylic acid-4,5'-disulphonic acid, 3-aminophenyl-naphthyl-(2')-urea-4,4',8'-trisulphonic acid, 4-amino-phenyl-naphthyl-(2')-urea - 3,4',8' - trisulphonic acid, 4-amino - phenyl - naphthyl-(1')-urea-3,3',6'-trisulphonic acid, 3-amino-phenyl-naphthyl-(1')-urea-4,3',6'-trisulphonic acid.

Examples of diazo compounds usable according to the invention which contains a radical

are:
1-amino-3-[3',5',6'-trichloropyrimidyl-(4')-amino]-benzene-6-sulphonic acid,
1-amino-4-[2',5',6'-trichloropyrimidyl-(4')-amino]-benzene, sulphonic acid,
1-amino-3-[2',6-dichloropyrimidyl-(4')-amino]-benzene-6-sulphonic acid,
1-amino-4-[2',6'-dichloropyrimidyl-(4')-amino]-benzene-2-sulphonic acid,
1-amino-3-[5'-bromo-2',6'-dichloropyrimidyl-(4')-amino]-benzene-6-sulphonic acid,
1-amino-3-[4',6'-dichlorotriazinyl-(2')-amino]-benzene-6-sulphonic acid,
1-amino-4-[4',6'-dichlorotriazinyl-(2')-amino]-benzene-2-sulphonic acid,
1-amino-3-[4',(3''-sulphophenylamino)-6'-chlorotriazinyl-(2')-amino]-benzene-6-sulphonic acid
1-amino-3-[4'-methoxy-6'-chlorotriazinyl (2')-amino]-benzene 6-sulphonic acid, 1-amino-4-[4'-methoxy-6'-chlorotriazinyl-(2')-amino]-benzene 2-sulphonic acid,
1-amino-3-[4'-amino-6'-chlorotriazinyl-(2')-amino]-benzene-6-sulphonic acid,
1-amino-4-(β-chloropropionyl-amino)-benzene-2-sulphonic acid,
1-amino-3-(β-chlorocrotonyl-amino)-benzene-6-sulphonic acid,
1-amino-3-(acryloamino)-benzene-6-sulphonic acid,
1-amino-3-[2',5',6'-trichloropyrimidyl-(4')-methyl-amino]-benzene-6-sulphonic acid,
1-amino-3-[4',6'-dichlorotriazinyl-(2')-methyl-amino]-benzene-6-sulphonic acid,
1-amino-3-[4'-dimethylamino-6'-chlorotriazinyl-(2')-amino]-benzene-6-sulphonic acid.

As examples of diazo compounds usable according to the invention which contain a group capable of forming the metal complex or a substituent which is easily converted into a metallisable group under the metallising conditions, are mentioned:
1-amino-2-methoxybenzene-5-sulphonic acid, 1-amino-2-methoxybenzene-4-sulphonic acid, 1-amino-2-hydroxybenzene-5-sulphonic acid, 1-amino-2-hydroxybenzene-3,5-disulphonic acid, 1-amino-2-hydroxybenzene-5-methylsulphone, 1-amino-2-hydroxybenzene-5-ethylsulphone, 1-amino-2-hydroxynaphthalene-4- or -6- sulphonic acid, 1-amino-2-hydroxynaphthalene-4,6-disulphonic acid, 2-amino-1-hydroxynaphthalene-4-sulphonic acid.

The last mentioned diazo components are used advantageously for the coupling with an azo component coupling in a position adjacent to a phenolic, naphtholic or enolic hydroxyl group whilst observing the conditions pertaining to choice as defined and the dyestuffs obtained are metallised advantageously by reacting with agents giving off copper in any suitable step of the reaction sequence.

Other diazo components which can be employed for coupling with azo components which contain the arylureido and

groups as defined are:
1-aminobenzene-2-sulphonic acid, 1-aminobenzene-2,4- or 2,5-disulphonic acid, 1-amino-4-methyl- or -methoxy- or -ethoxybenzene-2-sulphonic acid, 1-amino-5-acetylamino- or -benzoylamino benzene-2-sulphonic acid, 2-aminonaphthalene-1-sulphonic acid, 2-aminonaphthalene-1,5-disulphonic acid.

Examples of azo components which contain both an arylureido group and the radical

which are to be coupled with the diazo components mentioned in the previous paragraph and others similar thereto are:
Condensation product from one equivalent of 2,4,5,6-tetrachloropyrimidine, 5-bromo-2,4,6-trichloropyrimidine, 2,4,6-trichloropyrimidine, cyanuric chloride, 2-amino-4,6-dichlorotriazine, 2-ethoxy- or 2-methoxy- 4,6-dichlorotriazine, 2-(2'-, 3'- or 4'-sulphophenylamino)-4,6-dichlorotriazine, β-chloro- or β-bromo- propionyl chloride, acrylic chloride, β-chloro- or β-bromo- acrylic chloride and an equivalent of 1-(3'- or 4'-aminophenylureido)-5-hydroxynaphthalene-7-sulphonic acid, 2-(3'- or 4'-aminophenylureido)-5-hydroxynaphthalene - 7 - sulphonic acid, 2-(3'- or 4'-aminophenylureido)-6-hydroxynaphthalene-8-sulphonic acid, 2-(3'- or 4'-aminophenylureido)-8-hydroxynaphthalene-6-sulphonic acid, 1-(3'- or 4'-aminophenylureido)-8-hydroxynaphthalene-3,5- or 3,6- or 4,6-disulphonic acid.

Examples of coupling components containing an arylureido group which can be used according to the invention are:
1-(3'- or 4'-sulphophenylureido)-5-hydroxynaphthalene-7-sulphonic acid, 2-(3'- or 4'- sulphophenylureido)-5-hydroxynaphthalene-7-sulphonic acid, 2-(3'- or 4'- sulphophenylureido) - 8 - hydroxynaphthalene - 6 - sulphonic acid, 2-(3'- or 4'- sulphophenylureido)-6-hydroxynaphthalene-8-sulphonic acid, 1- or 2- (4'-hydroxy-3'-carboxy-5'-sulphophenylureido) - 5 - hydroxynaphthalene-7-sulphonic acid, 2-(4'-hydroxy-3'-carboxy-5'-sulphophenylureido)-8-hydroxynaphthalene-6-sulphonic acid, 2-(4'-hydroxy-3'-carboxy - 5' - sulphophenylureido)-6-hydroxynaphthalene-8-sulphonic acid, 1-(3',6'- or 4',6'- or 4',7'-disulphonaphthyl-(1)-ureido) - 5 - hydroxynaphthalene-7-sulphonic acid, 2-(3',6'- or 4',6'- or 4',7'-disulphonaphthyl-(1)-ureido)-5-hydroxynaphthalene-7-sulphonic acid, 2-(4',8'- or 5',7'- or 6',8'-disulphonaphthyl-(2)-ureido)-5-hydroxynaphthalene-7-sulphonic acid, 2-phenylureido-8-hydroxynaphthalene-6-sulphonic acid, 2-phenylureido-6-hydroxynaphthalene-8-sulphonic acid, 1- or 2-phenylureido-5-hydroxynaphthalene-7-sulphonic acid, 1-phenylureido-8-hydroxynaphthalene-3,5- or -3,6- or -4,6- disulphonic acid.

Examples of coupling components containing a radical

which can be used according to the invention are:
1-[2',5',6' - trichloropyrimidyl-(4')-amino]-5-hydroxynaphthalene - 7 - sulphonic acid, 2-[2',5',6'-trichloropyrimidyl - (4') - amino]-5-hydroxynaphthalene-7-sulphonic acid, 2-[2',5',6'-trichloropyrimidyl-(4')-amino]-6-hydroxynaphthalene-8-sulphonic acid, 2-[2',5',6'-trichloropyrimidyl - (4') - amino]-8-hydroxynaphthalene-6-sulphonic acid, 2-[2',6'-dichloropyrimidyl-(4')-amino]-5-hydroxynaphthalene-7-sulphonic acid, 2-[2',6'-dichloropyrimidyl-(4')-amino] - 8 - hydroxynaphthalene - 6 - sulphonic acid, 2-[5'-bromo-2',6'-dichloropyrimidyl-(4')-amino]-5-hydroxynaphthalene-7-sulphonic acid, 2-[4',6'-dichlorotriazinyl - (2') - amino]-5-hydroxynaphthalene-7-sulphonic acid, 2-[4',6'-dichlorotriazinyl-(2')-amino]-8-hydroxynaphthalene-6-sulphonic acid, 2-[4'-methoxy-6'-chlorotriazinyl - (2') - amino]-5-hydroxynaphthalene-7-sulphonic acid, 2-[4'-amino-6'-chlorotriazinyl - (2')-amino]-5-hydroxynaphthalene-7-sulphonic acid, 2-[4'-(4''- sulphophenylamino)-6'-chlorotriazinyl-(2')-amino]-5-hydroxynaphthalene-7-sulphonic acid, 2-[4'-(3''-sulphophenylamino)-6'-chlorotriazinyl-(2') - amino]-8-hydroxynaphthalene-6-sulphonic acid, 1- or 2-(β-chloropropionylamino)-, 1- or 2-(β-chloroacrylamino)-, 1- or 2-(β-chlorocrotonylamino)-, 1- or 2-(β-bromocrotonylamino)-, 1- or 2-crotonylamino-, 1- or 2-maleonylamino-, or 1- or 2-acrylamino- 5-hydroxynaphthalene-7-sulphonic acid, 1-[2',5',6'-trichloropyrimidyl - (4') - amino]-8 - hydroxynaphthalene-3,6-, -3,5- or -4,6- disulphonic acid, 1-[5'-bromo-2',6'-dichloropyrimidyl - (4') - amino]-8-hydroxynaphthalene-3,6-, -3,5- or -4,6-disulphonic acid, 1-[2',6'-dichloropyrimidyl-(4')-amino] - 8 - hydroxynaphthalene-3,6-, -3,5- or 4,6- disulphonic acid, 1-[4',6'-dichlorotriazinyl-(2')-amino]-8-hydroxynaphthalene-3,6-, -3,5- or -4,6-disulphonic acid, 1'-[4'-ethoxy-6'-chlorotriazinyl-(2')-amino]-8-hydroxynaphthalene-3,6-, -3,5- or -4,6- disulphonic acid, 1-[4'-amino-6'-chlorotriazinyl-(2')-amino]-8-hydroxynaphthalene-3,6-, -3,5- or -4,6- disulphonic acid, 1-[4'-(3''-sulphophenylamino)-6'-chlorotriazinyl-(2')-amino]-8-hydroxynaphthalene-3,6-, -3,5- or -4,6- disulphonic acid, 1-(β-chloropropionylamino)-, 1-(β-chloroacrylamino)-, 1 - (β - bromocrotonylamino)-, crotonylamino-, maleonylamino- or acroylamino-8-hydroxynaphthalene-3,6-, -3,5- or -4,6- disulphonic acid, 1- or 2-[2',5',6'-trichloropyrimidyl-(4')-methylamino] -5-hydroxynaphthalene-7-sulphonic acid, 2-[2',5'6'- trichloropyrimidyl-(4')-methylamino] - 8 - hydroxynaphthalene-6-sulphonic acid, 2-[4'-ethoxy-6'-chlorotriazinyl-(2')-ethylamino]-5-hydroxynapththalene - 7 - sulphonic acid, 2-[4'-(3''-sulphophenylamino) - 6' - chlorotriazinyl-(2')-methylamino]-8-hydroxynaphthalene - 6 - sulphonic acid.

Examples of other coupling components which are coupled with diazo component containing the defined arylureido and

groups are:

1-hydroxynaphthalene-3,6-, -3,8-, -4,6-, -4,7- or -4,8- disulphonic acid, 2-hydroxynaphthalene-3,6-, -3,7-, -4,8-, -5,7- or -6,8- disulphonic acid, 1-hydroxynaphthalene-3,6,8-trisulphonic acid, 2-hydroxynaphthalene-3,6,8-trisulphonic acid, 1-benzoylamino-8-hydroxynaphthalene-3,6-, -3,5- or -4,6- disulphonic acid, 1-amino-8-hydroxynaphthalene-2,4-disulphonic acid, 1 - amino - 8 - hydroxynaphthalene-2-sulphonic acid, 2-amino-5-hydroxynaphthalene-1,7-disulphonic acid, 2-amino-8-hydroxynaphthalene-3,6-disulphonic acid.

Examples of diazo components containing both an arylureido group and a group

to be coupled therewith are:

Condensation product from one equivalent of 2,4,5,6-tetrachloropyrimidine, 5 - bromo - 2,4,6-trichloropyrimidine, 2,4,6-trichloropyrimidine, cyanuric chloride, 2-amino-4,6-dichlorotriazine, 2-ethoxy- or 2-methoxy- 4,6-trichlorotriazine, 2-(2'-, or 3'- or 4'- sulphophenylamino) - 4,6-dichlorotriazine, $\beta$ - chloropropionyl chloride, $\beta$-bromopropionyl chloride, acrylic chloride, $\beta$-chloroacrylic chloride or $\beta$-bromoacrylic chloride and one equivalent of 3,3'-diaminodiphenyl urea-4-sulphonic acid, 3,4'-diaminodiphenyl urea-4-sulphonic acid, 4,3'-diaminodiphenyl urea-3-sulphonic acid, 4,4'-diaminodiphenyl urea-3-sulphonic acid.

The diazo components are diazotised with nitrous acid or the alkali metal salts thereof in the usual way in a mineral acid medium at low temperatures.

In order to avoid too previous reaction of reactive substituents, mild conditions are indicated both in the coupling as well as in the isolation and drying of the dyestuffs. Advantageously aqueous phases having low pH values of at most 8 are used and, after completion of the coupling, if necessary the pH is lowered to 4–6 by the addition of acid for the isolation and drying.

The dyestuffs are dried advantageously as quickly as possible at not too high temperatures, in particular under reduced pressure. Further details as to method can be seen from the following examples.

Particularly valuable reactive dyestuffs correspond to the formula

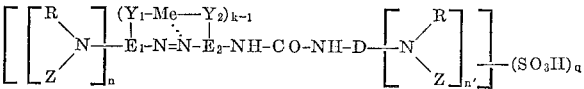

wherein $E_1$ and $E_2$ are independent radicals of the benzene, naphthalene or pyrazolone series. Monoazodyes of the benzene-azonaphthole series are preferred.

The radical D is preferably an unsubstituted phenyl radical. D can also be a substituted phenyl radical, particularly when $n'$ is 0, as substituents are preferred sulfonic acid, carboxylic acid and hydroxy groups.

The radical R is hydrogen or a lower alkyl, as lower alkyl especially alkyl having one or two carbon atoms, the methyl group being preferred.

One of Y and Y' is —O— and the other of Y and Y' is preferably —O—, but it can also be —COO—, Me is in particular copper, but it can also be chromium or cobalt, if desired the chromium or cobalt is co-ordinated with uncoloured and coloured complex formers.

One of $n$ and $n'$ is the number 0 and the other of $n$ and $n'$ is the number 1.

$q$ represents a low whole number of 3 to 5 inclusive, preferably the numbers 3 or 4, and $k$ is preferably the number 1, but it can also be 2.

The —$SO_3H$ moieties in the above formula are conventionally on one or more of the aromatic nuclei.

If $E_1$ and $E_2$ is a radical of the benzene series it is preferably the unsubstituted phenyl, but it can also be substituted, e.g. with nitro or with a carboxylic acid group. If $E_1$ or $E_2$ is a radical of the naphthalene series it is e.g. the unsubstituted naphthyl or preferably the hydroxynaphthyl, which if desired can be substituted by a benzoylamino group. If at least one of $E_1$ and $E_2$ is a radical of the pyrazolone series, it is preferably a 1-phenyl- or a 1-naphthyl-3-methyl-5-pyrazolone radical.

Examples of the reactive radical Z are principally:

(a) Polyhalogen-pyrimidyl radicals such as dihalogen pyrimidyl radicals, e.g. the 2,6-dichloro-pyrimidyl-(4) or the 2,6-dibromopyrimidyl-(4)- radical which can contain a substituent in the remaining position, in particular a further halogen atom, e.g. the 2,5,6-trichloropyrimidyl-(4) radical or the 2,6-dichloro-5-bromo-pyrimidyl-(4) radical.

(b) Halogen-1,3,5-triazinyl radicals which in the remaining position contain a substituent, in particular halogen, primary amino, arylamino or alkoxy groups, e.g. the 4,6-dichloro- 1,3,5-triazinyl radical, the 4 chloro-6-amino or 4-chloro-6-sulphophenylamino- 1,3,5-triazinyl radical, the 4-chloro-6-methoxy- or 4-chloro-6-ethoxy-1,3,5-triazinyl radical.

(c) Lower $\beta$-halogen fatty acid radicals containing at most 4 carbon atoms such as $\beta$-halogen alkanoyl radicals, e.g. the $\beta$-chloropropionyl radical and particularly $\beta$-halogen alkenoyl radicals, e.g. the $\beta$-chloro-acrylyl radical, the $\beta$-chlorocrotonyl radical.

Halogen in the radicals mentioned is, in particular, chlorine but it can also be bromine.

(d) Groups capable of addition such as $$CH_2=CH-CO-$$

and $$HO_3S-O-CH_2-CH_2-CO-$$

In addition, dyestuffs which contain the dichloropyrimidyl group and, especially, the trichloropyrimidyl group are preferred.

The new dyestuffs are yellow, orange, red, violet, blue, brown to black powders which, in the form of their alkali metal salts dissolve well in water. They are suitable for the dyeing and printing of fibres, in particular natural or regenerated cellulose fibres and natural or synthetic polyamide fibres, in yellow, orange, red, brown and violet, blue, grey to black shades. The cellulose material is impregnated or printed advantageously at a low temperature, e.g. at 20–50° C., with the possibly thickened dyestuff solution and then the dyestuff is fixed by treatment with acid binding agents. Examples of such are sodium carbonate, potassium carbonate, di- and tri-sodium phosphate, caustic soda lye and, at temperatures of over 50°, also potassium or sodium carbonate. The treatment with these agents can be performed at room temperature or at a raised temperature. Instead of subjecting the impregnated materials to an alkaline after-treatment, the acid binding agent can, in many cases, also be added to the impregnating liquors or printing pastes, after which the dyeing is developed by a short heating to temperatures of over 100 to 160° or by storing for a longer time at room temperature.

The new dyestuffs are chemically bound to the fibre by the treatment with acid binding agents and, after soaping to remove non-fixed dyestuffs, the cellulose dyeings in particular have excellent wet fastness properties. Compared with analogous dyestuffs which do not contain the arylureido group as defined, the dyestuffs according to the invention have, as a particular advantage, an increased substantivity to cellulose. They are suitable, therefore, for the dyeing of cellulose from a bath having a low ratio of goods to liquor in particular in the presence of salts which accelerate the drawing of the dyestuff such as Glaubers salt or sodium chloride. It is surprising that, in spite of this increased substantivity, non-fixed dyestuff can be very easily and completely washed out which is one of the most important conditions for good wet fastness properties of cellulose dyeings attained with reactive dyestuffs.

The following examples illustrate the invention. Where not otherwise expressly stated, parts are given therein as parts by weight. The temperatures are in degrees centigrade. The relationship of parts by weight to parts by volume is as that of grammes to cubic centimeters.

*Example 1*

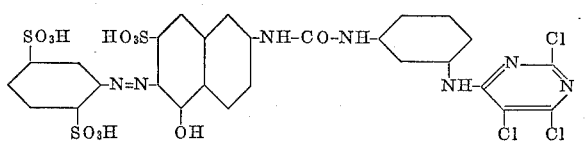

25.3 parts of 1-aminobenzene-2,5-disulphonic acid are diazotised in the known manner and coupled with 41.0 parts of 2-(3'-aminophenylureido)-5-hydroxynaphthalene-7-sulphonic acid in the presence of 20 parts of sodium bicarbonate. As soon as no more diazonium compound can be traced, the dystuff is precipitated with sodium chloride, filtered off, washed with dilute sodium chloride solution and again dissolved at 60–65° in 500 parts of water. 24.0 parts of finely pulverized tetrachloropyrimidine are then sprinkled in within 1 hour, care being taken that, by the simultaneous addition dropwise of sodium carbonate solution, the reaction mixture always remains neutral. As soon as no more free amino groups can be traced, the new dyestuff is precipitated with sodium chloride solution, filtered off, washed with dilute sodium chloride solution and dried in vacuo at 60°. It is a dark red powder which dissolves in water with an orange-red colour.

4 parts of the new dyestuff are dissolved in 1000 parts of water and 20 parts of sodium carbonate are added. 100 parts of cotton are entered at 40°, the bath is heated to 90–95° within 30 minutes, 80 parts of sodium chloride are added and dyeing is performed for 1 hour at this temperature. The goods are then rinsed and soaped at the boil for 15 minutes. A deep, brilliant orange dyeing is obtained which has good fastness to light and water.

Dyestuffs having similar properties are obtained if, instead of the 24.0 parts of 2,4,5,6-tetrachloropyrimidine the equivalent amount of 2,4,6-trichloro-5-bromopyrimidine, 2,4,6-trichloropyrimidine, 2,4,6-tribromopyrimidine, cyanuric chloride, 2-amino-4,6-dichlorotriazine, 2-methoxy-4,6-dichlorotriazine, 2-(4'-sulphophenylamino)-4,6-dichlorotriazine, β-chloropropionyl chloride, β-chlorocrotonic acid chloride, β-chloroacrylic acid chloride or vinyl carbonyl chloride is used.

Similar dyestuffs are also obtained if, in the above example, instead of the 1-aminobenzene-2,5-disulphonic acid or the 2-(3'-aminophenylureido)-5-hydroxynaphthalene-7-sulphonic acid, the corresponding amount of one of the diazo or coupling components given in the following table is reacted with one of the acid halides or halogenazines listed in the previous paragraph.

*Table 1*

| Dye-stuff No. | Diazo component | Coupling component | Shade on cellulose fibres |
|---|---|---|---|
| 1 | 1-aminobenzene-2,4-di-sulphonic acid | 2-(4'-aminophenylureido)-5-hydroxynaphthalene-7-sulphonic acid | Orange. |
| 2 | 2-aminonaphthalene-1,5-disulphonic acid | do | Red-orange. |
| 3 | do | 2-(3'-aminophenylureido)-5-hydroxynaphthalene-7-sulphonic acid | Do. |
| 4 | 2-aminonaphthalene-4,6,8-trisulphonic acid | do | Do. |
| 5 | do | 2-(3'-aminophenylureido)-8-hydroxynaphthalene-6-sulphonic acid | Red. |
| 6 | 1-aminobenzene-2,5-disulphonic acid | do | Scarlet. |
| 7 | do | 1-(4'-aminophenylureido)-8-hydroxynapthalene-4,6-disulphonic acid | Blueish red. |
| 8 | 2-aminonaphthalene-1,5-disulphonic acid | 1-(3'-aminophenylureido)-8-hydroxynaphthalene-4,6-disulphonic acid | Do. |
| 9 | do | 1-(3'-aminophenylureido)-8-hydroxynaphthalene-3,6-disulphonic acid | Bluish red. |
| 10 | do | 2-(3'-aminophenylureido)-6-hydroxynaphthalene-8-sulphonic acid | Brown-orange. |
| 11 | 3-aminodiphenyl urea-4,3'-disulphonic acid | do | Brown. |
| 12 | do | 2-(3'aminophenylureido)-8-hydroxynaphthalene-6-sulphonic acid | Scarlet. |
| 13 | 4-aminodiphenyl urea-3,4'-disulphonic acid | 1-(4'-aminophenylureido)-8-hydroxynaphthalene-3,6-disulphonic acid | Blueish red. |
| 14 | do | 1-(3'-aminophenylureido)-8-hydroxynaphthalene-4,6-disulphonic acid | Do. |
| 15 | do | 1-(3'-aminophenylureido)-5-hydroxynaphthalene-7-sulphonic acid | Do. |
| 16 | 1-amino-2-carboxybenzene-5-sulphonic acid | do | Orange. |
| 17 | 1-amino-2-carboxybenzene-4-sulphonic acid | do | Do. |
| 18 | 1-aminobenzene-2,4-disulphonic acid | 2-(N-methylaminophenyl-ureido)-5-hydroxynaphthalene-7-sulphonic acid | Do. |
| 19 | 2-aminonaphthalene-1,5-disulphonic acid | 2-(3'-N-methylaminophenyl-ureido)-8-hydroxynaphthalene-6-sulphonic acid | Red. |

EXAMPLE 2

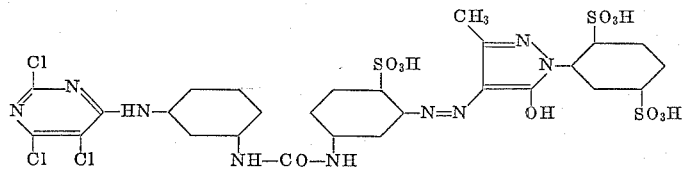

50.4 parts of 3-amino-3'-[2'',5'',6''-trichloropyrimdyl(4'')-amino]-diphenyl urea-4-sulphonic acid, in the form of the sodium salt, are pasted in 400 parts of water, 6.9 parts of sodium nitrite are added and the whole is added dropwise at 10–15° to 30 parts of concentrated hydrochloric acid and 200 parts of water. After stirring for 2 hours at 10–15°, the yellow diazonium suspension is poured into a solution of 36.9 parts of 1-(2′,5′-disulphophenyl)-3-methyl-5-pyrazolone and 20 parts of sodium bicarbonate in 200 parts of water. As soon as no more diazonium groups can be traced, the new yellow dyestuff is precipitated with sodium chloride, filtered off, washed with dilute sodium chloride solution and dried in vacuo at 60–70°. It is a yellow powder which dissolves in water with a yellow colour.

Cotton is impregnated with a solution which contains 20 parts of the new dyestuff, 20 parts of caustic soda lye of 36° Bé. and 50 parts of sodium sulphate in 1000 parts of water, the goods are rolled up and stored for 24 hours at 20–30°. The lemon yellow dyeing is then rinsed and soaped at the boil for 15 minutes. The dyeing has very good fastness to light and good wet fastness properties and it can be discharged white both neutral and alkaline.

The 3-amino-3′-[2″,5″,6″-trichloropyrimidyl - (4″)-amino]-diphenyl urea-4-sulphonic acid used in this example as diazo component is produced by reacting 1,3-diaminobenzene-4-sulphonic acid with an equivalent 3-nitrophenyl isocyanate, reducing the nitro group to the amino group according to Béchamp and then condensing with the equimolecular amount of 2,4,5,6-tetrachloropyramidine.

Similar dyeings are obtained if, in the above example, instead of the 50.4 parts of 3-amino-3′-[2″,5″,6″-trichloropyrimidyl-(4″)-amino] - diphenyl urea-4-sulphonic acid and the 36.9 parts of 1-(2′,5′-disulphophenyl)-3-methyl-5-pyrazolone, the corresponding amount of one of the diazo or coupling components given in the following table is used and the dyestuffs obtained are applied by the dyeing process described.

*Table 2*

| Dyestuff No. | Diazo component | Coupling component | Shade on cellulose fibres |
|---|---|---|---|
| 1 | 3-amino-3′-[2″,5″,6″-trichloropyrimidyl-(4″)-amino]-diphenyl urea-4-sulphonic acid. | 1-hydroxynaphthalene-4,6-disulphonic acid | Scarlet. |
| 2 | ----do---- | 1-hydroxynaphthalene-3,6-disulphonic acid | Do. |
| 3 | ----do---- | 2-hydroxynaphthalene-5,7-disulphonic acid | Red-orange. |
| 4 | ----do---- | 1-benzoylamino-8-hydroxynaphthalene-3,6-disulphonic acid. | Blueish red. |
| 5 | ----do---- | 1-phenylureido-8-hydroxynaphthalene-4,6-disulphonic acid. | Do. |
| 6 | ----do---- | 1-(5′,7′-disulphonaphthyl-(2))-3-methyl-5-pyrazolone | Yellow. |
| 7 | 3-amino-4′-[2″,6″-dichloroparimidyl-(4″)-amino]-diphenyl urea-4-sulphonic acid. | 1-hydroxynaphthalene-4,6-disulphonic acid | Scarlet. |
| 8 | ----do---- | 1-(2′,5′-disulphophenyl)-3-methyl-5-pyrazolone | Yellow. |
| 9 | 3-amino-3′-[4″-methoxy-6″-chlorotriazinyl-(2″)-amino]-diphenyl urea-4-sulphonic acid. | 2-hydroxynaphthalene-5,7-disulphonic acid | Orange. |
| 10 | 3-amino-4′-[4″-(3‴-sulphophenylamino)-6″-chlorotriazinyl-(2″)-amino]-diphenyl-urea-4-sulphonic acid. | 1-(4′,8′-disulphonaphthyl-(2′))-3-methyl-5-pyrazolone | Yellow. |
| 11 | ----do---- | 1-phenylureido-8-hydroxynaphthalene-3,6-disulphonic acid. | Blueish red. |
| 12 | 3-amino-3′-(β-chlorotonylamino)-diphenyl urea-4-sulphonic acid. | 1-hydroxynaphthalene-4,7-disulphonic acid | Scarlet. |
| 13 | 3-amino-3′-[2″,5″,6″-trichloropyrimidyl-(4″)-methylamino]-diphenylurea-4-sulphonic acid. | 1-hydroxynaphthalene-4,6-disulphonic acid | Do. |
| 14 | 3-amino-3′-[-β-sulphohydroxypropionylamino]-diphenylurea-4-sulphonic acid. | 1-hydroxynaphthalene-4,6-disulphonic acid | Do. |
| 15 | ----do---- | 1-hydroxynaphthalene-3,6-disulphonic acid | Do. |

EXAMPLE 3

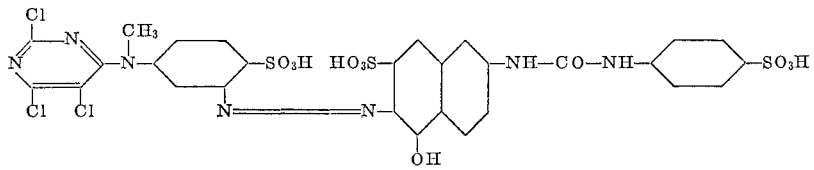

3.9 parts of 1-amino-3-[(2′,5′,6′-trichloropyrimidyl-(4′))-methylamino] - benzene-6-sulphonic acid are dissolved in 300 parts of water to give a neutral reaction, first 6.9 parts of sodium nitrite and then 25 parts of hydrochloric acid are added at 10–15° and the whole is stirred for 2 hours at 10–15°. The yellow diazonium suspension is then poured within 30 minutes into a solution of 48.2 parts of 2-(4′-sulphophenyl ureido)-5-hydroxynaphthalene-7-sulphonic acid and 40 parts of sodium bicarbonate in 300 parts of water. After stirring for 3 hours, the coupling is complete. The new dyestuff is precipiated with sodium chloride, filtered off, washed with dilute sodium chloride solution and dried in vacuo at 60–70°. It is a red powder which dissolves in water with an orange-red colour.

Cotton is pad dyed with a solution of 20 parts of the new dyestuff, 20 parts of sodium carbonate and 200 parts of urea in 1000 parts of water, dried at 40°, subjected for 4 minutes to a dry heat treatment at 140°, then rinsed and soaped at the boil for 15 minutes. A pure orange-red dyeing is obtained which has good light and very good wet fastness properties. In addition, the dyeing can be discharged white both neutral and alkaline.

Dyestuffs having similar properties are obtained if, in the above example, instead of the 36.9 parts of 1-amino-3-[(2′,5′,6′-trichloropyrimidyl-(4′)) - methyl - amino]-benzene-6-sulphonic acid or the 48.2 parts of 2-(4′-sulphophenylureido) - 5 - hydroxynaphthalene-7-sulphonic acid, the corresponding amount of one of the diazo or coupling components given in the following table are used:

of sodium chloride, filtered off, washed with dilute sodium chloride solution and dried in vacuo. It is a red powder which dissolves in water with a red-orange colour.

Table 3

| Dyestuff No. | Diazo component | Coupling component | Shade on cellulose fibres |
|---|---|---|---|
| 1 | 1-amino-3-[2',5',6'-trichloropyrimidyl-(4')-methyl-amino]-benzene-6-sulphonic acid. | 2-(3'-sulphophenylureido)-8-hydroxynaphthalene-6-sulphonic acid. | Scarlet. |
| 2 | ......do...... | 1-phenylureido-8-hydroxynaphthalene-3,6-disulphonic acid. | Red. |
| 3 | ......do...... | 2-(4'-hydroxy-3'-carboxy-5'-sulphophenylureido)-5-hydroxynaphthalene-7-sulphonic acid. | Orange. |
| 4 | 1-amino-3-[2',6'-dichloropyrimidyl-(4')-amino]-benzene-6-sulphonic acid. | ......do...... | Do. |
| 5 | 1-amino-3-[2',5',6'-trichloropyrimidyl-(4')-amino]-benzene-6-sulphonic acid. | 2-(4'-sulphophenylureido)-5-hydroxynaphthalene-7-phonic acid. | Do. |
| 6 | 1-amino-3-[4',6'-dichlorotriazinyl-(2')-amino]-benzene-6-sulphonic acid. | 1-phenylureido-8-hydroxynaphthalene-4,6-disulphonic acid. | Blueish red. |
| 7 | 1-amino-3-[4'-amino-6'-chlorotriazinylamino-(2')]-benzene-6-sulphonic acid. | ......do...... | Do. |
| 8 | 1-amino-3-[4'-ethoxy-6'-chlorotriazinylamino-(2')]-benzene-6-sulphonic acid. | 1-phenylureido-8-hydroxynaphthalene-3,6-disulphonic acid. | Do. |
| 9 | 1-amino-3-[4'-(3''-sulphophenylamino)-6'-chlorotriazinyl-(2')-amino]-6-sulphonic acid. | 2-(3'-sulphophenylureido)-5-hydroxynaphthalene-7-sulphonic acid. | Orange. |
| 10 | 1-amino-3-(β-chlorocrotonylamino)-benzene-6-sulphonic acid. | ......do...... | Do. |
| 11 | 1-amino-3-(β-chloropropionylamino)-benzene-6-sulphonic acid. | ......do...... | Do. |
| 12 | 1-amino-3-[2',5',6'-trichloropyrimidyl-(4')-amino]-benzene-6-sulphonic acid. | 1-phenylureido-8-hydroxynaphthalene-4,6-disulphonic acid. | Red. |
| 13 | 1-amino-3-[2',5',6'-trichloropyrimidyl-(4')-ethyl-amino]-benzene-6-sulphonic acid. | 2-(3'-sulphophenylureido)-8-hydroxynaphthalene-6-sulphonic acid. | Scarlet. |
| 14 | ......do...... | 2-(4'-sulphophenylureido)-5-hydroxynaphthalene-7-sulphonic acid. | Orange. |
| 15 | 1-amino-3-(β-sulphohydroxypropionyl-amino)-benzene. | 2-(4-sulphophenylureido)-5-hydroxynaphthalene-7-sulphonic acid. | Do. |
| 16 | ......do...... | 1-phenylureido-8-hydroxynaphthalene-3,6-disulphonic acid. | Scarlet. |

EXAMPLE 4

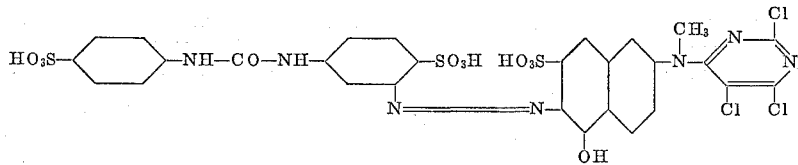

38.7 parts of 3-amino-diphenylurea-4,4'-disulphonic acid, in the form of the sodium salt, are dissolved in 300 parts of water and first 6.9 parts of sodium nitrite and then 25 parts of concentrated hydrochloric acid are added to the solution at 15°. After stirring for 2 hours at 15–20°, the yellow diazonium suspension is poured at 20–25° into a solution of 47.8 parts of 2-[(2',5',6'-trichloropyrimidyl-(4'))-methyl-amino] - 5 - hydroxynaphthalene-7-sulphonic acid and 40 parts of sodium carbonate in 400 parts of water. As soon as no more diazonium groups can be traced, the new dyestuff is precipitated by the addition If cotton or staple fibre is dyed with the new dyestuff by one of the methods described in Examples 1–3, then a strong red-orange dyeing having good wet and light fastness properties is obtained.

Dyestuffs having similar properties are obtained if, in the above example, instead of 38.7 parts of 3-amino-diphenylurea-4,4'-disulphonic acid or instead of the 47.8 parts of 2-[(2',5',6'-trichloropyrimidyl-(4'))-methyl-amino]-5-hydroxynaphthalene-7-sulphonic acid, one of the diazo or coupling components given in the following table is used.

Table 4

| Dyestuff No. | Diazo component | Coupling component | Shade on cellulose fibres |
|---|---|---|---|
| 1 | 3-amino-diphenylurea-4,4'-disulphonic acid | 2-[(2',5',6'-trichloropyrimidyl-(4'))-amino]-8-hydroxynaphthalene-6-sulphonic acid. | Scarlet. |
| 2 | ......do...... | 1-[(4',6'-dichlorotriazinyl-(2'))-amino]-5-hydroxynaphthalene-7-sulphonic acid. | Red. |
| 3 | ......do...... | 1-(β-chlorocrotonylamino)-8-hydroxynaphthalene-3,6-disulphonic acid. | Blueish red. |
| 4 | 3-amino-diphenylurea-4,3'-disulphonic acid | 1-[(2',6'-dichloropyrimidyl-(4'))-methyl-amino]-8-hydroxynaphthalene-3,6-disulphonic acid. | Red. |
| 5 | ......do...... | 1-(β-chloropropionylamino)-8-hydroxynaphthalene-4,6-disulphonic acid. | Do. |
| 6 | ......do...... | 2-[(4'-amino-6'-chlorotriazinyl-(2'))-methyl-amino]-8-hydroxynaphthalene-6-sulphonic acid. | Scarlet. |
| 7 | 3-amino-4'-hydroxy-3'-carboxy-diphenylurea-4,5'-disulphonic acid. | ......do...... | Red. |
| 8 | ......do...... | 1-[(2',6'-dichlorophyrimidyl-(4'))-amino]-8-hydroxynaphthalene-3,6-disulphonic acid. | Blueish red. |
| 9 | ......do...... | 1-acroylamino-8-hydroxynaphthalene-4,6-disulphonic acid. | Do. |
| 10 | 3-amino-diphenylurea-4,4'-disulphonic acid | 2-[2',5',6'-trichloropyrimidyl-(4'))-ethylamino]-8-hydroxynaphthalene-6-sulphonic acid. | Scarlet. |
| 11 | ......do...... | 1-[(4',6'-dichlorotriazinyl-(2'))-ethylamino]-5-hydroxynaphthalene-7-sulphonic acid. | Do. |
| 12 | ......do...... | 2-(β-sulphohydroxypropionylamino)-5-hydroxynaphthalene-7-sulphonic acid. | Do. |

EXAMPLE 5

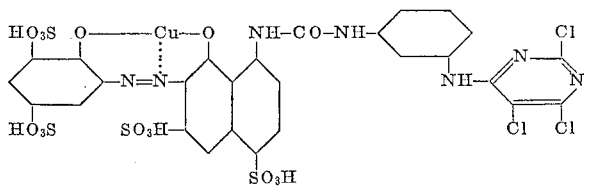

26.9 parts of 1-amino-2-hydroxybenzene-3,5-disulphonic acid are diazotised in the usual way and coupled with 69.8 parts of 1-[3′-(2″,5″,6″-trichloropyrimidyl-(4″)-amino-phenylureido] - 8 - hydroxynaphthalene-4,6-disulphonic acid in the presence of 30 parts of sodium bicarbonate. The dyestuff formed is precipitated with sodium chloride, filtered off, washed with dilute sodium chloride solution, again dissolved in 500 parts of water (60° warm) and 40 parts of crystallised sodium acetate are added to the solution. 25 parts of crystallised copper sulphate dissolved in 100 parts of water are then poured in within 15 minutes and the whole is stirred for 30 minutes at 60°. The metallised monoazo dyestuff is precipitated with sodium chloride, filtered off, washed with dilute sodium chloride solution and dried in vacuo at 60–70° It is a black powder which dissolves in water with a violet colour.

If cotton or staple fibre is dyed with the new dyestuff by one of the methods described in Examples 1–3, then a violet dyeing which has very good wet and light fastness properties is obtained.

Dyestuffs having similar properties are obtained if, instead of the 26.9 parts of 1-amino-2-hydroxybenzene-3,5-disulphonic acid and instead of the 69.8 parts of 1-[3′-(2″,5″,6″-trichloropyrimidyl-(4″) - amino - phenylureido]-8-hydroxynaphthalene - 4,6 - disulphonic acid, the corresponding amount of one of the diazo or coupling components given in the following table is used and the monoazo dyestuff obtained is converted into the corresponding complex with one of the metals given in the same table.

*Table 5*

| Dyestuff No. | Diazo component | Coupling component | Metal in complex linkage | Shade on cellulose fibres |
|---|---|---|---|---|
| 1 | 1-amino-2-hydroxybenzene-3,5-disulphonic acid | 2-[3′-(2″,5″,6″-trichloropyrimidyl-(4″)-amino)-phenylureido]-8-hydroxynaphthalene-6-sulphonic acid. | Cu | Ruby red. |
| 2 | do | 2-[3′-(2″,6″-dichloropyrimidyl-(4″)-amino]-phenylureido-5-hydroxynaphthalene-7-sulphonic acid. | Cu | Do. |
| 3 | 1-amino-2-hydroxy-6-nitro-naphthalene-4-sulphonic acid. | do | Cr/Co | Black. |
| 4 | 1-amino-5-[4′,6′-dichlorotriazinyl-(2′)-amino]-2-hydroxybenzene-3-sulphonic acid. | 1-phenylureido-8-hydroxynaphthalene-4,6-disulphonic acid. | Cu | Reddish blue. |
| 5 | do | 2-phenylureido-6-hydroxynaphthalene-8-sulphonic acid. | Cr | Black. |
| 6 | 1-amino-3-[4′-(3″-sulphophenylamino)-6′-chlorotriazinyl-(2′)-amino]-2-hydroxybenzene-5-sulphonic acid. | 1-phenylureido-8-hydroxynaphthalene-3,6- disulphonic acid. | Cu | Violet. |
| 7 | 1-amino-2-hydroxybenzene-3,5-disulphonic acid | 1-[3′-(β-chloropropionylamino)-phenylureido]-8-hydroxynaphthalene-3,6-disulphonic acid. | Cu | Do. |
| 8 | 1-amino-2-hydroxybenzene-5-methylsulphone | 1-[4′-(β-chlorocrotonylamino)-phenylureido]-8-hydroxynaphthalene-4,6-disulphonic acid. | Cu | Do. |
| 9 | do | 1-[4′-(3″-sulphophenylamino)-6′-(chlorotriazinyl-(2″)-amino)-phenylureido]-8-hydroxynaphthalene-4,6-disulphonic acid. | Cu | Do. |
| 10 | 2-amino-1-benzoic acid | 2-[3′-(2″,5″,6″-trichloropyrimidyl-(4″)-amino)-phenylureido]-5-hydroxynaphthalene-7-sulphonic acid. | Cr | Brown. |
| 11 | 4-amino-3-carboxydiphenylurea-4-sulphonic acid | do | Cr | Do. |
| 12 | do | 1-[3′-(2″,5″,6″-trichloropyrimidyl-(4″)-amino)-phenyl]-3-methyl-5-pyrazolene. | Cr | Yellow. |
| 13 | 6-(2′,5′,6′-trichloropyrimidyl-(4′)-amino)-2-amino-1-hydroxybenzene-4-sulphonic acid. | 1-[3′(4″-sulphophenylureido)-phenyl]-3-methyl-5-pyrazolone. | Co | Brown-yellow. |

EXAMPLE 6

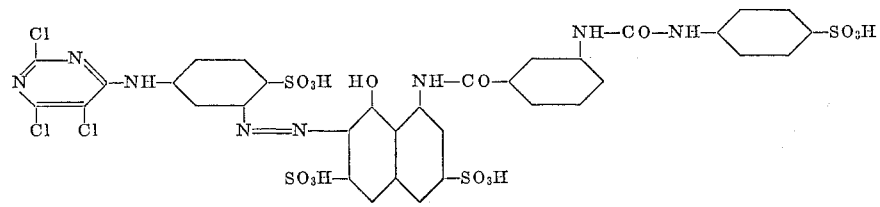

81.9 parts of the aminomonoazo dyestuff of the formula

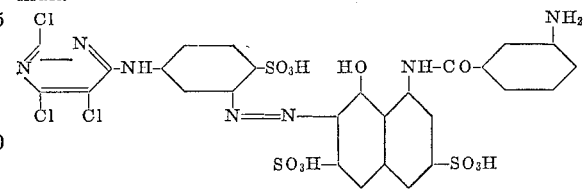

in the form of the sodium salt, are dissolved in 500 parts of water at 50° and 32.5 parts of 4-sulphophenylcarbamic acid phenolester are added to the solution within 1 hour at this temperature. As soon as no more free amino groups can be traced, the new dyestuff is precipitated with sodium chloride, filtered off, washed with dilute sodium chloride solution and dried in vacuo at 60–70°. It is a dark red powder which dissolves in water with a blueish-red colour.

If cotton or staple fibre is dyed with the new dyestuff by one of the methods described in Examples 1–3, then a brilliant, blueish red dyeing having good wet and light fastness properties is obtained.

What is claimed is:
1. The reactive dyestuff of the formula

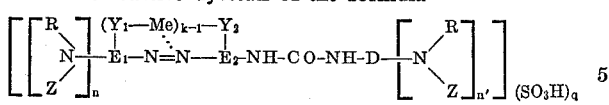

wherein
E₁—N=N—E₂ is a moiety selected from the group consisting of phenyl-azo-naphthyl, naphthyl-azo-naphthyl, 1-phenyl-3-methyl-pyrazol-5-onyl-azo-phenyl, 1-naphthyl-3-methyl-pyrazol-5-onyl-azo-phenyl and the aforesaid moiety substituted with one of the substituents phenylureido, benzylamino, nitro, and methylsulfonyl, D is a member selected from the group consisting of phenyl and o-hydroxy-carboxyphenyl, R is a member selected from the group consisting of hydrogen and lower alkyl, Z is a member selected from the group consisting of di- and tri-halogeno pyrimidyl-(4), mono-halogeno-s-triazinyl substituted with one of the substituents phenyl, alkoxy, alkylmercapto, amino and phenylamino, dihalogeno-s-striazinyl, β-halogeno-lower fatty acid, HO₃S—O—CH₂—CH₂—CO— and

CH₂=CH—CO— wherein the halogen has an atomic weight of 35 to 80, one of $n$ and $n'$ is zero and the other of $n$ and $n'$ is 1, one of Y₁ and Y₂ is —O— and the other of Y₁ and Y₂ is a member selected from the group consisting of —O— and —COO—, each of Y₁ and Y₂ is linked to E₁ and E₂, respectively, in ortho-position to the azo bridge, Me is a metal selected from the group consisting of copper, chromium and cobalt, $q$ represents one of the whole numbers 3 to 5 inclusive and $k$ represents one of the whole numbers 1 and 2 E₁ being

H
|
E₁ and —Y₂ being H—Y₂ when $k$ is 1.

2. The reactive dyestuff of the formula

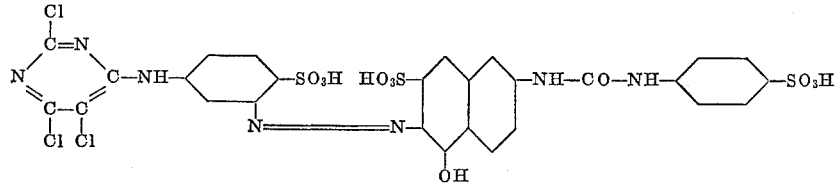

3. The reactive dyestuff of the formula

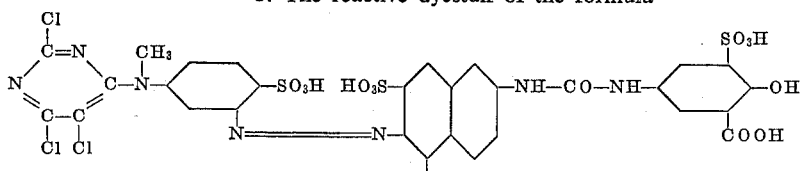

4. The reactive dyestuff of the formula

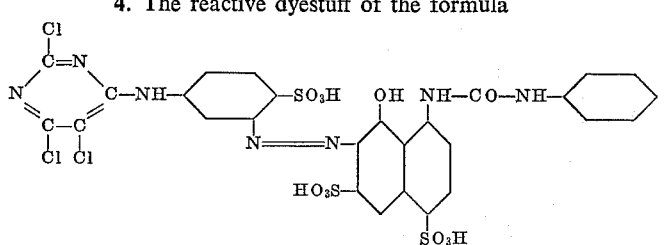

5. The reactive dyestuff of the formula

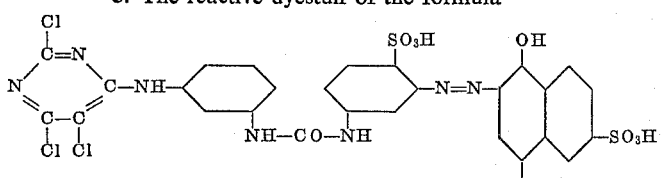

6. The reactive dyestuff of the formula

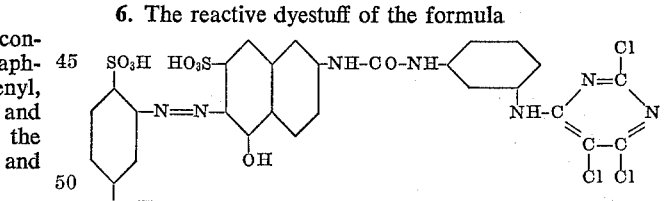

References Cited by the Examiner
UNITED STATES PATENTS

| | | | |
|---|---|---|---|
| 2,128,325 | 8/38 | Rose et al. | 260—151 |
| 2,891,941 | 6/59 | Fasciati et al. | 260—153 |
| 2,945,021 | 7/60 | Fasciati et al. | 260—153 |
| 2,993,885 | 7/61 | Fasciati | 260—153 |
| 3,004,022 | 10/61 | Stephen | 260—153 |

FOREIGN PATENTS

| | | |
|---|---|---|
| 214,546 | 4/61 | Austria. |
| 565,447 | 9/58 | Belgium. |
| 1,221,621 | 1/60 | France. |
| 1,225,281 | 2/60 | France. |
| 1,110,460 | 10/55 | France. |
| 1,246,743 | 10/60 | France. |
| 87,960 | 4/58 | Netherlands. |

OTHER REFERENCES

Capponi et al.: "American Dyestuff Reporter" July 10, 1961, pp. 23 to 32.

Wegmann: "Textil Praxis," October 1958, pp. 1056-1061.

CHARLES B. PARKER, *Primary Examiner.*